United States Patent [19]

Canter, Jr. et al.

[11] Patent Number: 4,742,204
[45] Date of Patent: May 3, 1988

[54] LEAD WELDING PROCESS, APPARATUS AND PRODUCT

[76] Inventors: Clifton H. Canter, Jr., 246 Huntley Dr.; Christopher L. Canter, P.O. Box 1915, both of Lake Placid, Fla. 33852

[21] Appl. No.: 729,655

[22] Filed: May 2, 1985

[51] Int. Cl.⁴ .............................................. B23K 9/225
[52] U.S. Cl. .............................. 219/60 R; 219/137 R; 285/286
[58] Field of Search ............... 219/60 R, 60.2, 125.11, 219/136, 137 R, 149; 285/286

[56] References Cited

U.S. PATENT DOCUMENTS

| | | | |
|---|---|---|---|
| 1,202,687 | 10/1916 | Elkerton | 285/13 |
| 1,435,010 | 11/1922 | Lachman | 285/286 |
| 1,683,548 | 9/1928 | Hughey | 29/218 |
| 1,862,796 | 6/1932 | Martin | 219/137 R X |

OTHER PUBLICATIONS

Cary, Howard B. *Modern Welding Technology*. Englewood Cliffs, New Jersey: Prentice-Hall, Inc., 1979, pp. 95–96.

Primary Examiner—E. A. Goldberg
Assistant Examiner—C. M. Sigda
Attorney, Agent, or Firm—Charles J. Prescott; Raymond H. Quist

[57] ABSTRACT

Flashing for a pipe is produced by joining a lead sheet having a hole in it for passing over the pipe, and a lead cylinder which is to surround the pipe and be bent into the top thereof. The joint is formed by producing mating flares on the lead sheet and cylinder and welding the two together. The weld is performed in the presence of an inert gas by drawing an arc between an electrode and the joint. The portion of the joint being welded is brought to a horizontal orientation by having the flares at a 45 degree angle and supporting the two parts on a rotating table inclined at 45 degrees.

3 Claims, 1 Drawing Sheet

LEAD WELDING PROCESS, APPARATUS AND PRODUCT

BACKGROUND OF THE INVENTION

1. Field of the Invention

This invention relates generally the production of lead flashing items, and more particularly to an apparatus using a welding process to produce said items.

2. Description of the Prior Art

Flashing is commonly used on roofs at locations where a pipe or the like passes through the roof. The purpose is to prevent rain water from running down the outside of the pipe and leaking into the building. Lead flashing is particularly useful because it is extremely pliable and can therefore be easily bent to fit over the top of the pipe and to conform to the roof line.

Building codes generally specify a minimum thickness of the lead to be used in flashing. For example, flashing meeting a specification requiring flashing weighing two and one-half pounds per square foot is produced using lead sheets 0.039 inches thick. Both the cylinder portion and the flat sheet portion of the pipe flashing are therefore made from lead having the same thickness.

Lead flashing for a pipe is formed from a flat sheet with a circular hole punched from it which is joined to a cylinder. The cylinder may be formed by extrusion or by bending a flat sheet around a cylindrical form and making a butt joint of some type. It is common practice to make a butt joint between two lead edges by application of heat at the joint, with or without the addition of supplementary lead or solder, so that forming a lead cylinder is not particularly difficult. If however, the ends are overlapped and heat is applied by torch, the top layer of lead will melt and run off before the bottom layer becomes hot enough to fuse the two layers together.

The joint between the flat sheet and the cylinder is conventionally formed by placing the flat sheet (with the cylinder standing on it in the desired location) on a horizontally oriented, rotating table. The operator uses a torch to melt a bar of lead or solder so that it will form a bead of supplementary lead or solder completely around the cylinder at its juncture with the flat sheet. The operator controls the rate of rotation of the table by letting it rub against his hand and also holds the torch and the bar of lead or solder in the proper position. If the speed of rotation is too slow or the torch is held too close, a hole will result and the product may be ruined beyond repair. If the operator tries to avoid holes by permitting the table to rotate too fast or keeping the torch too far from the juncture, fusion between the supplementary metal and the lead sheet and cylinder being joined will not occur.

Some fabrication errors can be corrected after they are discovered, but spoilage and excessive time of fabrication have made production of lead flashing for pipes costly, particularly with unskilled workers. An unskilled worker typically may produce 60 usable flashing products in one eight hour day using this existing technique. Approximately three months of experience are needed before an acceptable level of 500 products per day is achieved.

The low production rate and high spoilage (especially with unskilled workers) make production by the conventional method expensive because of labor costs; and the cost of the additional lead or solder used to make the bead is an added detrimental factor. There are other methods which are currently used such as using a ring of solder which is postioned at the joint and then melted, and forming the bead on the bottom of the flat sheet, but these have the same objectionable features.

It is therefore an object of this invention to provide a method of producing lead flashing which is less dependent upon skill than conventional methods.

It is also an object of this invention to provide a method of producing lead flashing which results in less spoilage.

It is an additional object of this invention to produce lead flashing without the need for adding additional metal to form the joint.

SUMMARY OF THE INVENTION

A lead sheet having a hole therein and a lead cylinder, both having the same thickness, are positioned on a rotatable table having a cylindrical mandrel extending therefrom. The cylinder is first given a flared edge at the end to be joined and a mating flared edge is produced on the lead sheet by forcing it against a conical form at the juncture of the table and mandrel. A cylinder having a conical cutout at its bottom is pounded against the joint to make the flare and to eliminate any air pockets between the surfaces to be joined. While the table is rotated an electric arc is struck between an electrode and the joint which is continued through a complete revolution so that fusion occurs between the flared portion of the flat sheet and the flared portion of the cylinder around the entire joint. The table is positioned at an angle of 45 degrees with the horizontal and the flares are made at 45 degrees also. The joint is horizontal at the top which is where the arc is struck to prevent molten lead from running off.

DETAILED DESCRIPTION OF THE INVENTION

Figure 1:
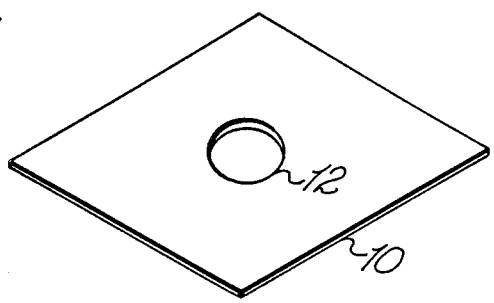
FIG. 1 shows a flat lead sheet used in making the lead flashing of this invention.

FIG. 1 shows flat lead sheet 10 having circular hole 12 in the center thereof. Flat lead sheet 10 has a thickness which may be specified by a building code for lead flashing. Circular hole 12 is typically punched from flat lead sheet 10 in conventional fashion and has a diameter at least as large as the outside diameter of the pipe for which flashing is being fabricated.

Figure 2:
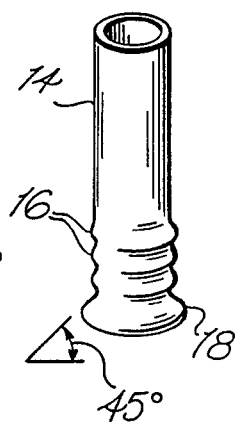
FIG. 2 shows a lead cylinder used in making the lead flashing of this invention.

FIG. 2 shows lead cylinder 14 which has a wall thickness the same as that of flat lead sheet 10 of FIG. 1. Cylinder 14 may be formed by extrusion or by bending a flat sheet around a cylindrical form and joining the edges using well known techniques. Cylinder 14 has corrugations 16 near its bottom end to facilitate its installation on a pipe passing through a pitched roof. In accordance with the invention, flare 18 has been formed at the bottom of cylinder 14. Flare 18 is preferably at an angle of 45 degrees although some variation from this angle would probably still permit fabrication of the flashing of this invention.

Figure 3:
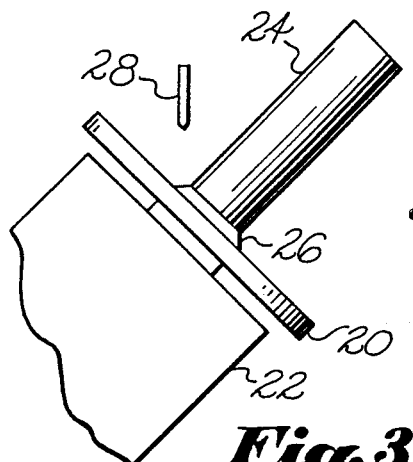
FIG. 3 shows the apparatus used in making the lead flashing of this invention.

FIG. 3 illustrates table 20 which may be rotated by drive 22 upon activation of suitable switching means not shown. The speed of rotation of table 20 is varied in accordance with the size of the flashing to be fabricated, as will be discussed subsequently. Mounted at the center of table 20 is mandrel 24 and between the surface of table 20 and the surface of mandrel 24 is conical member 26. As shown, table 20 is mounted at an angle of 45 degrees with the horizontal and mandrel 24 is orthogonal to table 20, so that the portion of conical member 26 which is at the top is horizontal. Electrode 28 is positioned so as to be centerized with respect to conical member 26.

Figure 4:
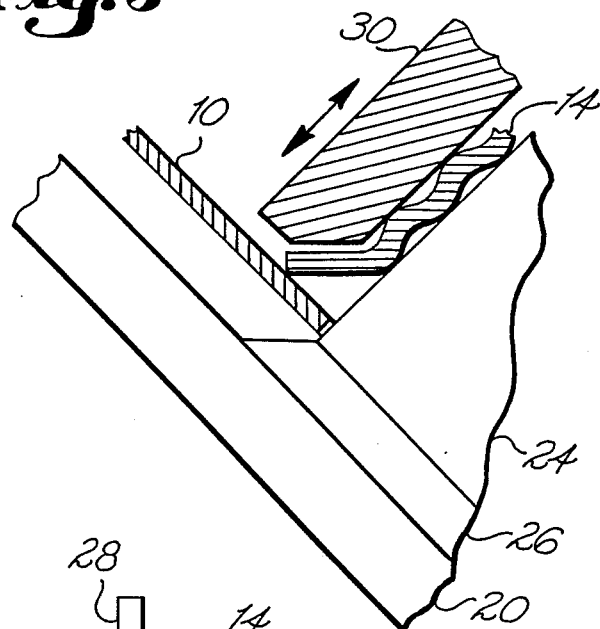
FIG. 4 is a fragmentary view of the apparatus in an intermediate step in the process.

Turning next to FIG. 4, an enlarged fragmentary representation of table 20, mandrel 24 and conical member 26 is shown. Flat sheet 10 has been placed over mandrel 24 and is resting on conical member 26. Cylinder 14 has also been placed over mandrel 24 and is resting on flat sheet 10. Hammer 30, which is a heavy metal cylinder having a conical indentation at its lower edge, is then struck or pounded on the flared portion of cylinder 14 and forces it and the underlying flat sheet 10 against conical member 26 and table 20. This hammering step not only forms a flare on flat sheet 10 which will mate with the flare on cylinder 14, but also removes any air pockets which would cause defects in the joint to be made.

Figure 5:
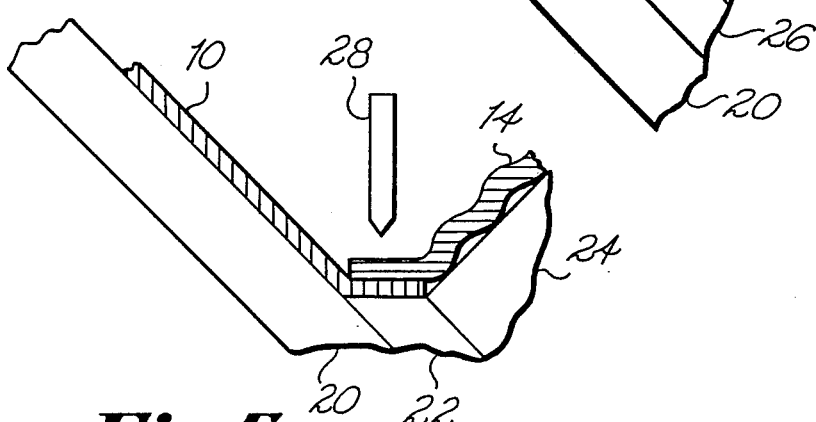
FIG. 5 is a fragmentary view of the apparatus in a further step of the process.
Figure 6:
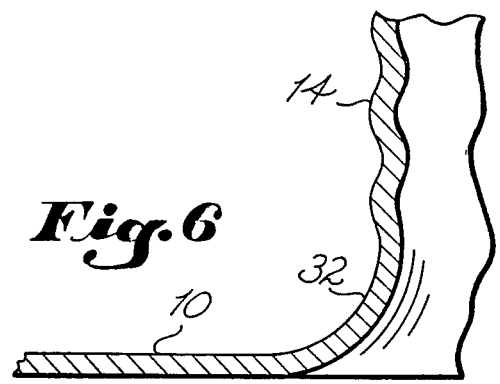
FIG. 6 shows the lead flashing joint produced in the process of this invention.

FIG. 5 again shows a fragmentary view of table 20, mandrel 24 and conical member 26, with flat sheet 10 and cylinder 14 after the hammering step of FIG. 4. Table 20 is rotated at a constant speed and welding is initiated. Welding is performed in the presence of an inert gas such as argon by striking an electric arc between electrode 28 and the overlapped portion of flat sheet 10 and cylinder 14. Electrode 28 is positioned before top dead center so that lead which becomes hot enough to flow will tend to be at the top point in the rotation of table 20 and will have recooled enough before passing top dead center so that it will not flow off. As opposed to the melting of the top layer only which occurs when using a torch against overlapped lead layers, fusion of the two layers appears complete based on examination of the completed weld by sawing through it. This appearance is represented in FIG. 6. It will be noted that the resulting joint 32 is of double the thickness of flat sheet 10 and cylinder 14. This beneficial since the joint is most likely to be stressed in installation and handling. Recognition of this additional strength at the joint has resulted in an exception in a building specification in one case where the joint thickness was ruled to be equivalent to the required sheet thickness for flashing made in the conventional manner.

Not only is the resulting product superior, but an unskilled worker can produce 500 acceptable flashing units per day after a single day of training.

There remain variable factors in this process. The speed of rotation of table 20, the amperage applied by electrode 28, the thickness of the lead and the diameter of the cylinder can all change. In carrying out the invention, a Linde Heliarc 250 HF machine with the current set at a low setting of 45 to 55 amps and table 20 rotating at about 8 RPMs has been satisfactory as a starting point. Individual workers are able to work more satisfactorily using different setting—some preferring a faster speed of rotation with a higher current and others a lower speed with a lower current. Once a worker arrives at satisfactory settings for making a lead flashing of a particular size and thickness, no further adjustments are needed. The rotational speed, current setting and the gap between work and electrode are then automatically controlled.

Although a single embodiment of a lead flashing and the method of fabricating it have been illustrated and described, it will be evident that changes and modifications can be made without departing from the spirit of the invention and the scope of the appended claims.

We claim:

1. A lead (Pb) flashing having an elongated hollow lead cylinder with a circular base meeting a flat lead sheet at a joint, said sheet having a circular opening therein generally coextensive with said circular base of said cylinder, and said joint being at an angle of 45 degrees to said flat sheet and said cylinder and having an overlapped portion of said flat sheet and said cylinder, produced by a process comprising the steps of:
   forming a flare on one end of said hollow lead cylinder;
   supporting said lead sheet at an angle to a horizontal plane;
   said lead sheet having a circular opening therein generally coextensive with said circular base of said cylinder;
   placing the flared end of said lead cylinder against said lead sheet concentrically with said circular opening of said lead sheet;
   forming a mating flare on said lead sheet by forcing said flared end of said lead cylinder against said lead sheet, whereby said flare on said cylinder and said flare on said lead sheet are juxtaposed and have an overlapped portion;
   rotating said juxtaposed flat sheet and cylinder;
   striking an arc between an electrode and said juxtaposed and overlapped flares in the presence of an inert gas; and
   maintaining said arc through a complete revolution of said juxtaposed and overlapped flares, whereby a joint is formed through said overlapped portion.

2. Lead flashing produced by the process of claim 1 wherein:
   said angle at which said lead sheet is supported is 45 degrees; and
   said flare at the end of said cylinder is at an angle of 45 degrees with said cylinder.

3. Lead flashing produced by the process of claim 1 wherein:
   said rotation is at a rate slow enough to prevent molten lead from running off.

* * * * *